April 10, 1962   J. F. HERUBEL   3,028,635
ADVANCING SCREW FOR GILL BOX
Filed Nov. 9, 1959
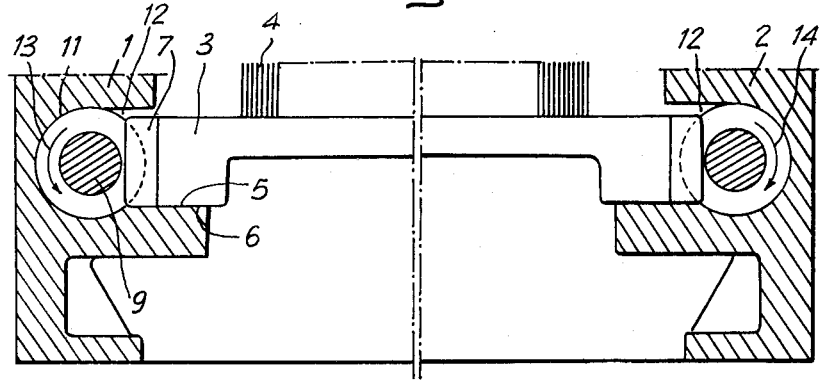
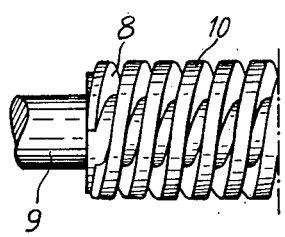
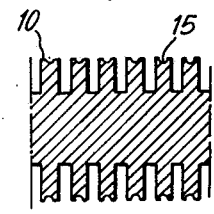
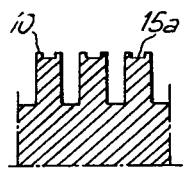
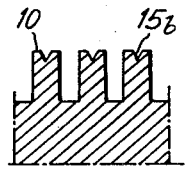
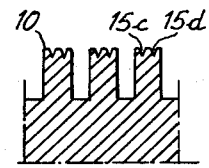
INVENTOR:
JEAN FRÉDÉRIC HERUBEL

United States Patent Office 3,028,635
Patented Apr. 10, 1962

3,028,635
ADVANCING SCREW FOR GILL BOX
Jean Frédéric Herubel, Guebwiller, Haut-Rhin, France, assignor to N. Schlumberger & Cie., Guebwiller, France, a French company
Filed Nov. 9, 1959, Ser. No. 851,610
Claims priority, application France Apr. 17, 1959
8 Claims. (Cl. 19—129)

The present invention has for its object improvements in the mounting of rotary members, chiefly screws having a deep cut thread and which are inserted in a smooth bore provided with a partly open periphery.

The invention covers more particularly but not exclusively the screws guiding the faller bars in certain textile machines of the gill-box and intersecting type, including a plurality of fallers arranged one behind the other and forming the set of fallers. Said fallers are generally guided at their ends by screws having a deep cut thread and the rotation of which produces a progression of the set of fallers as a whole.

Now, it occurs from time to time that, during the working of the textile materials, certain fibres are becoming released off from the set of fallers and are wedged between the screws and their supports. The machine gets jammed then and this leads to a loss in the production and sometimes to a breaking of certain parts. It is possible to provide, in such a case, a sufficient clearance between the screws and their supports, so as to allow the fibres to pass, but this would be detrimental to the accuracy of operation of the machine.

The present invention has for is object to remove the above-mentioned drawbacks and, furthermore, to better distribute the lubricant in the support.

To this end, gaps are provided in the contacting surface between the screws or the like rotary members and their supports, these gaps have an extent such that the area of said contacting surface may be substantially reduced.

According to a further feature of the invention and in the case of a screw the thread of which is bounded outwardly by a cylindrical surface lying in contact with the wall of a smooth cylindrical bore, at least one helical groove having any suitable cross-section is cut in said surface of the thread in contact with the bore.

Further features and advantages of the invention will appear in the reading of the following description, reference being made to the accompanying drawings, wherein:

FIG. 1 diagrammatically illustrates, in cross-sectional view, an application of the invention to the guiding screws of the faller bars of a drawing frame of the gill-box type.

FIG. 2 is a perspective view of a conventional guiding screw.

FIG. 3 is an elevational view of a screw according to the present invention.

FIGS. 4, 5 and 6 illustrate, in half-longitudinal sectional view, on a larger scale, three modifications of a screw according to the invention.

In FIG. 1, 1 and 2 designate supports for a drawing frame including a number of fallers 3 provided with one or more rows of needles 4. The ends of the fallers 3 are provided each with a horizontal bearing surface 5, slidably carried by a bearing surface 6 formed on the corresponding supports 1 and 2, while the faller ends or heads 7 of each faller engage the deep cut thread 8 (as illustrated more particularly in FIG. 2) of the cooperating screws 9.

The thread 8 is bounded outwardly by a cylindrical surface 10 lying in contact with the smooth cylindrical surface of a bore 11 provided in the supports 1 and 2. Said bore is longitudinally open at 12 allowing the faller ends 7 to pass and to engage the thread 8, through said opening 12. When the screws such as 9 rotate in the direction of the arrows 13 and 14 at the opposite ends of the fallers, respectively, with a view to shifting said fallers 3 along the supports 1 and 2, it may occur that fibres escaping from the needles 4 enter the opening 12. The fibres are then carried along by the threads 8 of the screws and are wedged between the latter and the bore 11, which may lead to a locking of the screws.

In order to remove this drawback, there are provided, according to the invention, gaps between the surface 10 bounding the cut thread and the smooth surface of the bore 11, said surfaces being in contact with each other. In the embodiment illustrated in FIG. 3, a helical groove 15, of a substantially semi-circular cross-section, is cut to this end in the thread-bounding surface 10. This arrangement allows a substantial reduction in the area of the contacting surface between the thread 8 and the wall of the bore 11, whereby the forces acting over the smaller areas on each side of the groove 15 are greater so that fibres which may wedge between the screws and the bore are crushed and torn. They may then be readily released out of the bore, without this leading to any jamming of the screw. On the other hand, the recess formed by the groove 15 further the lubrication of the contact surface between the screw and its bore.

FIGS. 4, 5 and 6 illustrate three modifications of the groove 15 formed in the surface 10. In FIG. 4, there is provided a peripheral groove 15a having a rectangular cross-section, while FIG. 5 shows a groove 15b having a triangular cross-section. In FIG. 6, two grooves 15c and 15d having a triangular cross-section are cut side by side in the surface 10.

Obviously, the embodiments described hereinabove and illustrated in the drawings are given solely by way of examples and by no means in a limiting sense, and it is possible to modify in any desired manner the shape, the nature, the manner of mounting and the relative arrangement of the different components, without unduly widening thereby the scope of the invention as defined in the accompanying claims. Thus, instead of being provided on the outer bounding surface of the cut thread, the gaps in the contacting surfaces between the thread and the bore in the support may be formed in the wall of the bore. On the other hand, the gaps may assume any desired shape and be constituted by circular or longitudinal grooves or again by helical grooves having a pitch different from that of the actual thread.

Finally, the invention as claimed should not be restricted to the case as described of the set of faller bars and it may be extended, in a quite general manner, to the mounting of rotary members of any type, even inside bores which have no partly open periphery.

What I claim is:

1. A system comprising a screw the thread of which is bounded outwardly by a cylindrical surface and a carrier provided with a smooth cylindrical bore inside which the screw is revolvably guided, a helical groove being cut in the outer surface of the thread in contact with the wall of the bore to reduce the area of contact between the thread and the bore wall.

2. An advancing screw system comprising a supporting member having a smooth bore with a partly open periphery extending longitudinally for receiving a member for cooperative engagement with a screw therein, a rotary screw in said bore with a thread groove and an outer surface on each side of said thread groove in engaging contact with the smooth bore of the supporting member, and a groove defined in said outer surface intermediate the width of said surface.

3. In a textile machine including a pair of spaced supporting members, each of said members having a smooth bore extending along the length thereof with a partly open periphery extending along the opposing sides thereof, a faller slidable on said support members and having rack side portions disposed adjacent the open periphery of said support member bore, the improvement comprising an advancing screw disposed in said bore for engagement with said rack side portions and having a deep cut thread defining a spiral thread groove and portions on each side of the groove with outer surfaces in engagement with the smooth bore of said supporting member, and a groove defined on the outer surfaces of said portions on each side of the thread groove of said screw intermediate the width thereof reducing the area of contact between the bore and the surface of said screw.

4. An advancing screw system according to claim 2, wherein said groove defined in the outer surface of said screw is semicircular.

5. An advancing screw system according to claim 2, wherein said groove defined in the outer surface of said screw is rectangular.

6. An advancing screw system according to claim 2, wherein said groove is substantially V-shaped.

7. A system comprising a member having a smooth bore with an open periphery, and a rotary member having a deep thread cut therein and guided revolvably inside the smooth bore with the surface bounding the cut thread being in cooperative engagement with said bore, at least one of the cooperating surfaces of said bore and of the rotary member being provided with a recessed part reducing substantially the area of contact between said surfaces.

8. In a textile machine including a faller bar and a screw lying alongside the faller end to engage said faller and make the faller progress, the provision of a support for the faller end provided with a smooth bore with a partly open periphery in which is revolvably guided the corresponding screw, said screw being in cooperative engagement with the faller via the open periphery of said support and having walls between threads operably engaging with the surface of the smooth bore of said support, one of the surfaces constituted by the bore in said support and the cooperating screw walls between threads being provided with a recess reducing considerably the contacting area between said bore and said screw.

References Cited in the file of this patent
UNITED STATES PATENTS

| | | |
|---|---|---|
| 1,460,328 | Keyser et al. | June 26, 1923 |
| 1,723,396 | Ambler | Aug. 6, 1929 |
| 1,815,835 | Damonte | July 21, 1931 |